(12) United States Patent
Hasegawa

(10) Patent No.: US 8,645,769 B2
(45) Date of Patent: Feb. 4, 2014

(54) OPERATION MANAGEMENT APPARATUS, OPERATION MANAGEMENT METHOD, AND PROGRAM STORAGE MEDIUM

(75) Inventor: Hideo Hasegawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/133,719

(22) PCT Filed: Dec. 15, 2010

(86) PCT No.: PCT/JP2010/073058
§ 371 (c)(1),
(2), (4) Date: Jun. 9, 2011

(87) PCT Pub. No.: WO2011/083687
PCT Pub. Date: Jul. 14, 2011

(65) Prior Publication Data
US 2012/0278663 A1    Nov. 1, 2012

(30) Foreign Application Priority Data
Jan. 8, 2010 (JP) .................................. 2010-003008

(51) Int. Cl.
*G06F 11/00* (2006.01)
(52) U.S. Cl.
USPC ............................................ 714/48; 714/47.1
(58) Field of Classification Search
USPC ............... 714/25, 26, 47.1, 47.2, 47.3, 48, 49
See application file for complete search history.

(56) References Cited

U.S. PATENT DOCUMENTS

| 7,542,877 | B2 * | 6/2009 | Nakamura | 702/185 |
| 7,975,186 | B2 * | 7/2011 | Kato | 714/48 |
| 2006/0058898 | A1 * | 3/2006 | Emigholz et al. | 700/29 |
| 2009/0064764 | A1 * | 3/2009 | Kizaki et al. | 73/40.5 R |

FOREIGN PATENT DOCUMENTS

| JP | 2002342107 A | 11/2002 |
| JP | 2003263342 A | 9/2003 |
| JP | 2005285040 A | 10/2005 |
| JP | 2005327261 A | 11/2005 |
| JP | 2006244447 A | 9/2006 |
| JP | 2007122330 A | 5/2007 |
| JP | 2007207173 A | 8/2007 |
| JP | 2007323193 A | 12/2007 |
| JP | 2008009842 A | 1/2008 |
| JP | 2009199533 A | 9/2009 |

OTHER PUBLICATIONS

International Search Report for PCT/JP2010/073058 mailed Mar. 22, 2011.

* cited by examiner

*Primary Examiner* — Joseph D Manoskey
(74) *Attorney, Agent, or Firm* — Sughrue Mion, PLLC

(57) ABSTRACT

A time in which an administrator identifies a cause of a failure when the abnormality is detected in a plurality of servers is shortened.

An operation management apparatus includes a failure detection unit 26 and a spread determination unit 27. The failure detection unit 26 obtains measured values of a plurality of performance metrics with respect to each of a plurality of target apparatuses to be monitored that are connected to a common apparatus and detects an abnormal item which is the performance metric whose measured value is abnormal with respect to each of the plurality of target apparatuses to be monitored. The spread determination unit 27 outputs the remaining abnormal item excluding the abnormal item detected in all the plurality of target apparatuses to be monitored from the abnormal item of each of the plurality of target apparatuses to be monitored.

13 Claims, 12 Drawing Sheets

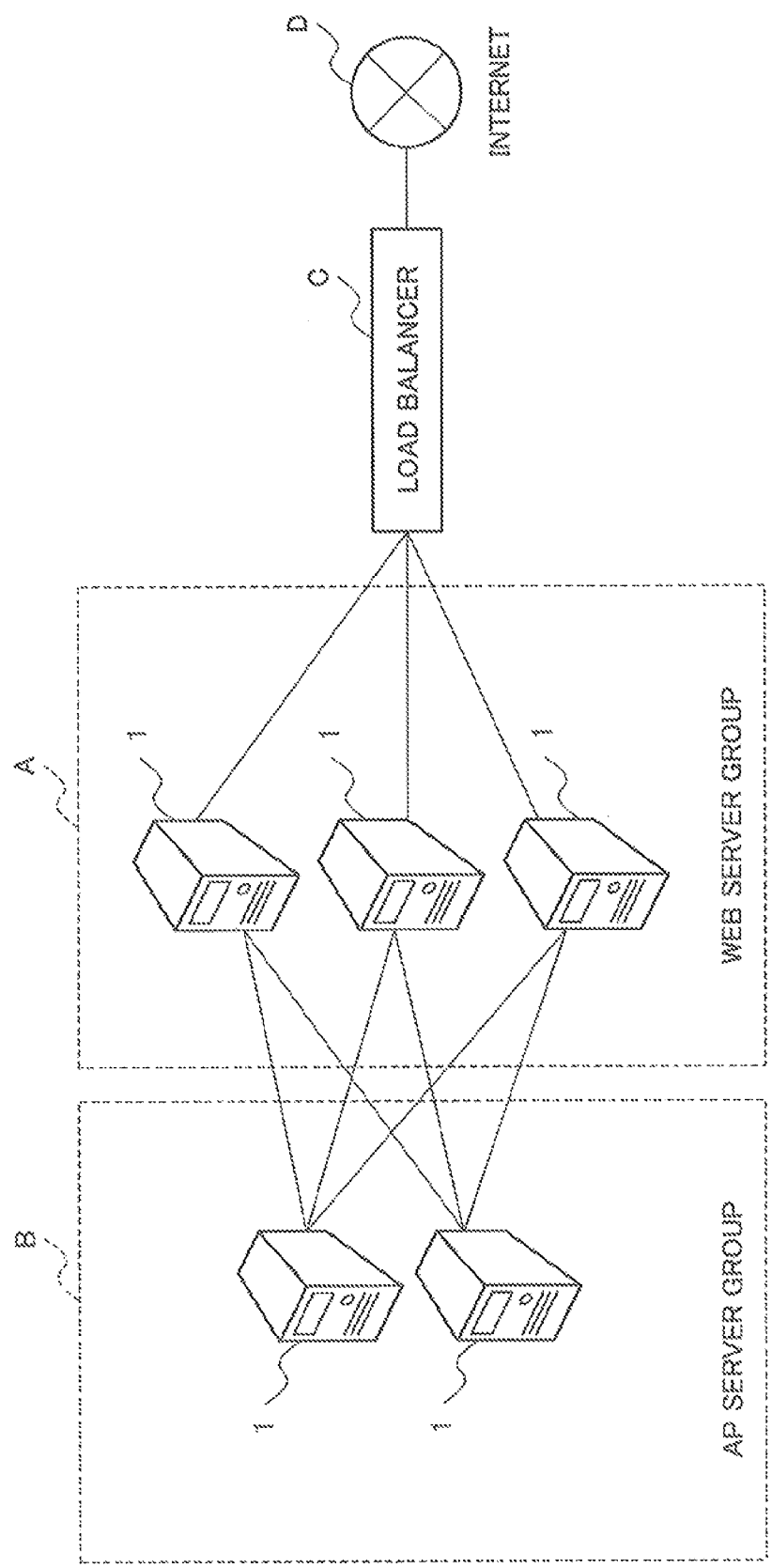

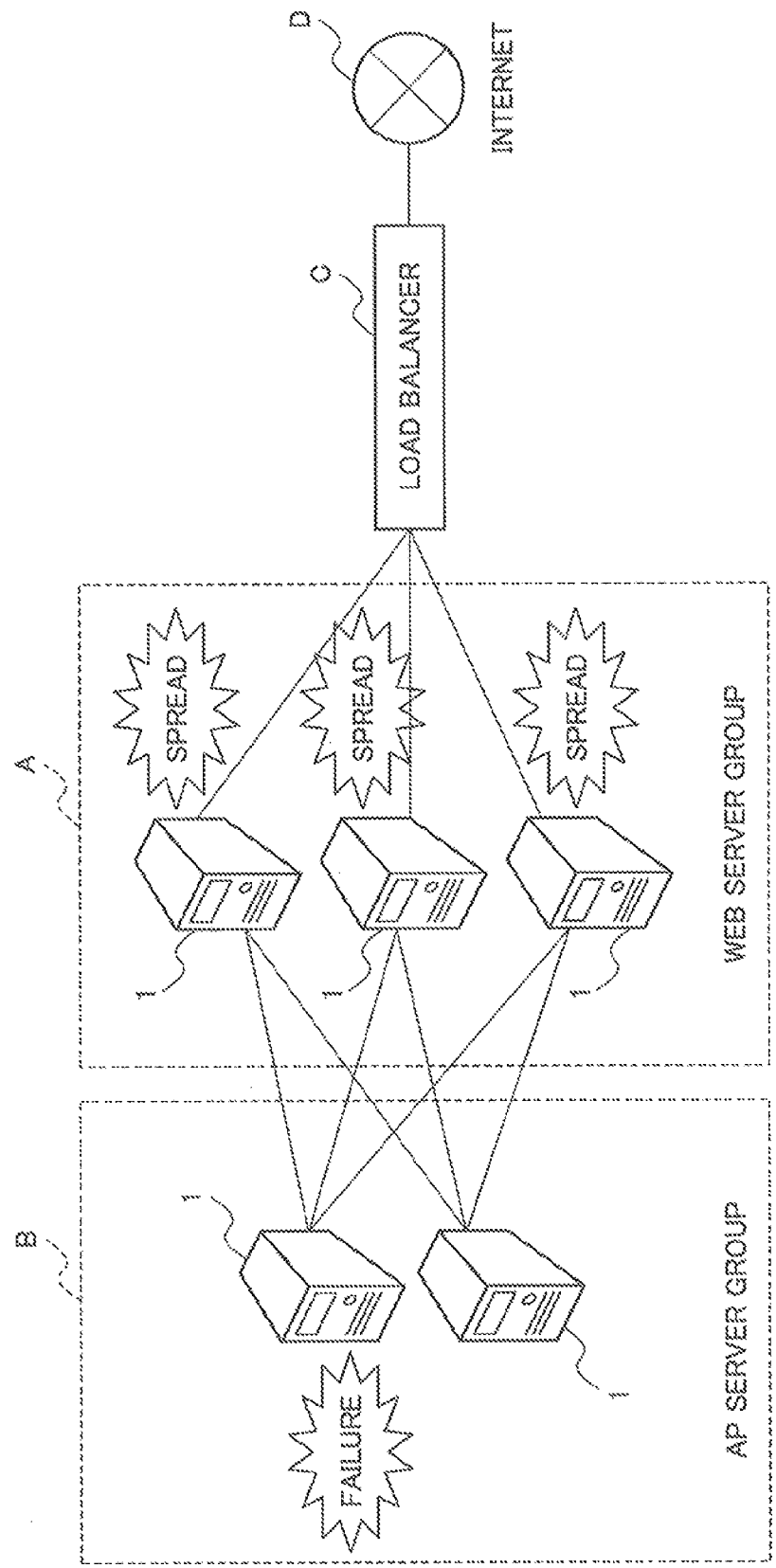

Fig. 4

[ABNORMAL ITEM OF WEB1]

| u | v |
|---|---|
| CPU user% | CPU system% |
| CPU system% | Disk IO/sec |
| Mem used% | AP1 Disk used% |

[ABNORMAL ITEM OF WEB2]

| u | v |
|---|---|
| CPU user% | CPU system% |
| CPU system% | Disk IO/sec |
| Mem used% | AP1 Disk used% |

[ABNORMAL ITEM OF WEB3]

| u | v |
|---|---|
| CPU user% | CPU system% |
| Mem used% | AP1 Disk used% |

[ABNORMAL ITEM OF AP1]

| u | v |
|---|---|
| CPU system% | CPU system% |
| CPU system% | Disk IO/sec |
| Packet Recv | Packet Sent |
| Web1 Mem used% | Disk used% |
| Web2 Mem used% | Disk used% |
| Web3 Mem used% | Disk used% |
| Mem used% | Disk used% |

[ABNORMAL ITEM OF AP2]

| u | v |
|---|---|
| CPU Wait IO | CPU system% |

Fig.5

[ABNORMAL ITEM OF WEB1]

| u | y |
|---|---|
| CPU system% | Disk IO/sec |

[ABNORMAL ITEM OF WEB2]

| u | y |
|---|---|
| CPU system% | Disk IO/sec |

[ABNORMAL ITEM OF WEB3]

| u | y |
|---|---|

[ABNORMAL ITEM OF AP1]

| u | y |
|---|---|
| CPU user% | CPU system% |
| CPU system% | Disk IO/sec |
| Packet Recv | Packet Sent |
| Web1 Mem used% | Disk used% |
| Web2 Mem used% | Disk used% |
| Web3 Mem used% | Disk used% |
| Mem used% | Disk used% |

[ABNORMAL ITEM OF AP2]

| u | y |
|---|---|
| CPU Wait IO | CPU system% |

Fig.6

| SERVER NAME | NUMBER OF ABNORMAL ITEMS | NUMBER OF CORRELATION MODELS | ABNORMALITY SCORE |
|---|---|---|---|
| AP1 | 7 | 20 | 0.35 |
| WEB1 | 1 | 10 | 0.1 |
| WEB2 | 1 | 10 | 0.1 |
| AP2 | 1 | 20 | 0.05 |
| WEB3 | 0 | 10 | 0 |

OPERATION MANAGEMENT APPARATUS, OPERATION MANAGEMENT METHOD, AND PROGRAM STORAGE MEDIUM

TECHNICAL FIELD

The present invention relates to an operation management apparatus which monitors operation information on a system, an operation management method thereof, and a program storage medium thereof.

BACKGROUND ART

In a technical field of an information system that is composed of a large number of servers and network devices that are installed in a data center or the like, importance of a service provided by the system, such as Web service, business service, as a social infrastructure increases. For this reason, it becomes indispensable that the each server for managing these services stably operates. An integrated management system which centrally monitors an operating status of a plurality of servers and detects the occurrence of a failure is known as a technology for managing such system.

For example, a system which obtains actually measured data online with respect to the operating status from the plurality of servers that are monitoring targets and detects abnormality when this actually measured data exceeds a threshold value is widely known as this integrated management system. However, in this system, when the abnormality is detected, it is necessary to narrow down the cause of the abnormality, for example, lack of memory capacity, load on a CPU, load on a network, or the like in order to restore the system.

Usually, in order to elucidate the cause of the abnormality, a system log and a parameter of a computer which seems to be relevant to the abnormality have to be checked. This check has to rely on a system engineer's experience and hunch. Therefore, it takes time and energy to elucidate the cause of the abnormality. For this reason, in a usual integrated management system, it is important to automatically perform analysis of a combination of the abnormal states or the like based on event data (state notification) collected from a plurality of devices, presume the big-picture problem point and the cause, notify an administrator of them, and support the administrator. Especially, in order to ensure the reliability of the service in a long term continuous operation, it is required to perform a planned enhancement of equipment by detecting not only the abnormality that has occurred but also performance degradation with which abnormality does not clearly appear or a sign of a failure predicted to occur in the future.

Here, the following technology related to such integrated management system is disclosed. A technology disclosed in Japanese Patent Application Laid-Open No. 2002-342107 reduces a service interruption time by limiting a restart range with respect to a process in which a software failure has occurred to a domain unit when it is identified that the detected system failure is the software failure.

A technology disclosed in Japanese Patent Application Laid-Open No. 2005-285040 collects continuous quantity information as an initial monitoring information from a plurality of network apparatuses, monitors statistical behavior of this continuous quantity information, collects a plurality of related monitoring information first when the behavior different from a usual one is detected, determines the each value, and thereby identifies the cause of a failure.

A technology disclosed in Japanese Patent Application Laid-Open No. 2006-244447 detects a failure tendency of various parameters in a data storage array and avoids the failure of the system. This technology controls an access to a memory array space composed of a plurality of data storage apparatuses and accumulates operation performance data from each data storage apparatus in a history log. This technology analyzes the operation performance data in order to detect the abnormal operation of the data storage apparatus and starts a correction process of the data storage apparatus in response to the analysis.

A technology disclosed in Japanese Patent Application Laid-Open No. 2008-9842 collects information about an operating state of a computer system, records correlation information showing a correlative relationship between the collected information, detects a failure which has occurred in a service carried out by a computer system from the correlation information and the collected information, and generates a process for recovering this failure. This technology determines an effect and an influence on the computer system by execution of this process by referring to the correlation information and decides at least one of whether or not to execute the process for which the effect and the influence are determined, an execution order thereof, and an execution time thereof.

A technology disclosed in Japanese Patent Application Laid-Open No. 2009-199533 obtains performance information for each of a plurality of kinds of performance items from a plurality of apparatuses to be managed and when the performance item or the apparatus to be managed is designated as an element, generates a correlation model for each combination of the elements based on a correlation function between a first performance series information showing a time series variation of performance information for a first element and a second performance series information showing the time series variation of performance information for a second element. This technology analyzes whether or not the performance information newly detected from the apparatus to be managed keeps the correlation model and if a result of the analysis is negative, it is determined that the element is abnormal.

SUMMARY OF INVENTION

Technical Problem

However, in the above-mentioned related technology, when a scale of the server system becomes large, the number of servers in which abnormality is detected increases and whereby an administrator focuses on a place different from the place at which the failure occurs and a problem in which it takes much time to identify a server that is a failure occurrence source has been occurred.

For example, in a multi-tier system composed of a plurality of server groups, there is a case in which abnormality caused by the failure occurred in one server spreads to a large number of other servers and affects them. In this case, the failure occurrence source becomes buried by the spread of abnormality. For example, in a three-tier system, the abnormality caused by the failure occurred in an application server spreads to an upper-tier Web server group and whereby the similar abnormality concurrently occurs in the Web server group. Usually, in many cases, the spread of abnormality occurs in a one-to-many relationship. There is a case in which a failure occurred in one application server is detected as the abnormalities occurred in one hundred Web servers. Here, when the administrator checks the servers in which the abnormality is detected in turn, if the administrator focuses on the one hundred Web servers, it takes much time to identify the application server that is the failure occurrence source.

An object of the present invention is to solve the above-mentioned problem and provide an operation management apparatus which can present effective information for identifying a failure occurrence source that causes the abnormality and shorten a time in which the administrator identifies the cause of the abnormality, an operation management method thereof, and a program storage medium thereof.

Solution to Problem

An operation management apparatus according to an exemplary aspect of the invention includes failure detection means for obtaining measured values of a plurality of performance metrics with respect to each of a plurality of target apparatuses to be monitored that are connected to a common apparatus and detecting an abnormal item which is a performance metric whose measured value is abnormal with respect to each of the plurality of target apparatuses to be monitored, and spread determination means for outputting remaining abnormal item excluding the abnormal item detected in all the plurality of target apparatuses to be monitored from the abnormal item of each of the plurality of target apparatuses to be monitored.

An operation management method according to an exemplary aspect of the invention includes obtaining measured values of a plurality of performance metrics with respect to each of a plurality of target apparatuses to be monitored that are connected to a common apparatus, detecting an abnormal item which is a performance metric whose measured value is abnormal with respect to each of the plurality of target apparatuses to be monitored, and outputting remaining abnormal item excluding the abnormal item detected in all the plurality of target apparatuses to be monitored from the abnormal item of each of the plurality of target apparatuses to be monitored.

A program recording medium recording thereon an operation management program, causing computer to perform a method, according to an exemplary aspect of the invention includes obtaining measured values of a plurality of performance metrics with respect to each of a plurality of target apparatuses to be monitored that are connected to a common apparatus, detecting an abnormal item which is a performance metric whose measured value is abnormal with respect to each of the plurality of target apparatuses to be monitored, and outputting remaining abnormal item excluding the abnormal item detected in all the plurality of target apparatuses to be monitored from the abnormal item of each of the plurality of target apparatuses to be monitored.

Advantageous Effects of Invention

The present invention has an advantage in which when abnormality is detected in a plurality of servers, an administrator can quickly identify a cause of a failure occurred in a system.

BRIEF DESCRIPTION OF DRAWINGS

FIG. 2 A drawing showing an example of a configuration of a multi-tier system in the exemplary embodiment.

FIG. 3 A drawing showing an example of a spread state of a failure which occurs in a multi-tier system in the exemplary embodiment.

FIG. 4 A drawing showing an example of an abnormal item in the exemplary embodiment.

FIG. 5 A drawing showing an example of abnormality information for management in the exemplary embodiment.

FIG. 6 A drawing showing an example of information outputted from an abnormality score calculation unit 28 in the exemplary embodiment.

DESCRIPTION OF EMBODIMENTS

Hereinafter, one exemplary embodiment of the present invention will be described based on the drawings.

Figure 1:
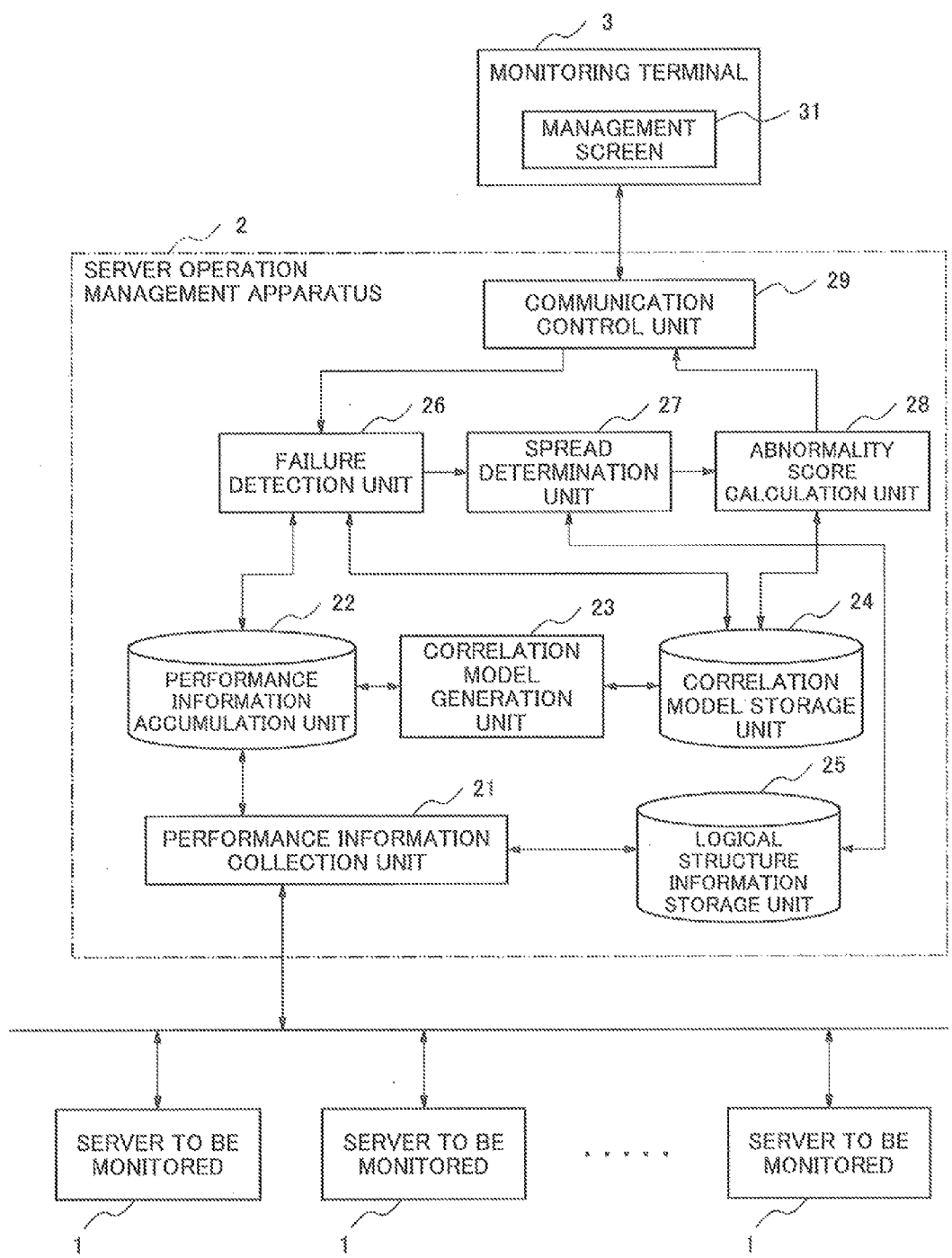
FIG. 1 A functional block diagram showing a configuration of a monitoring system according to an exemplary embodiment of the present invention.

FIG. 1 is a functional block diagram showing a configuration of a monitoring system of the exemplary embodiment. As shown in FIG. 1, the monitoring system of the exemplary embodiment includes a server operation management apparatus 2 and a monitoring terminal 3. The server operation management apparatus 2 monitors a plurality of servers 1 to be monitored (apparatus to be monitored). The monitoring terminal 3 transmits a request for checking whether or not abnormality occurs in each server 1 to be monitored to the server operation management apparatus 2 according to a check command entered by an operation of an administrator and also displays a check result received from the server operation management apparatus 2 in a management screen 31.

The server 1 to be monitored is a server which is a monitoring target of the server operation management apparatus 2 and of which the multi-tier system is composed. The multi-tier system is a system in which information processing for providing a service is separated into a plurality of tiers and a server group for load distribution is provided in each tier. For example, the three-tier system is composed of a Web server group, an application server group, and a database server group. FIG. 2 is a drawing showing an example of a configuration of the multi-tier system in the exemplary embodiment. In an example shown in FIG. 2, the three-tier system is composed of the servers 1 to be monitored. The three-tier system includes two application servers and three Web servers as the server 1 to be monitored. An AP server group B includes two application servers and a Web server group A includes three Web servers. An access from a client (not shown) or another server to the Web server group A via the Internet D is load distributed across individual Web servers by a load balancer C equally. The individual Web servers transfer a request to a first or a second application server at random.

Each server 1 to be monitored measures a plurality of performance metrics in the each server regularly and sends the actually measured data of each of the performance metrics to the server operation management apparatus 2 as performance information. Here, the metric indicates a performance metric which can be observed in a server or a network device. For example, a CPU (Central Processing Unit) usage rate, a memory usage, a disk usage status, an operating status of a service application, whether or not the latest update module is applied to an OS (Operating System) or an application, the number of times of a password error, and the like are used as the performance metric.

The server operation management apparatus 2 of the exemplary embodiment includes a performance information collection unit 21, a performance information accumulation unit 22, a failure detection unit 26, and a spread determination unit 27. The performance information collection unit 21 collects a set of the actually measured data that is measured with respect to the plurality of performance metrics as the performance information at each collection time from each of the plurality of servers 1 to be monitored of which the multi-tier system is composed. The performance information accumulation unit 22 accumulates the collected performance information on each server 1 to be monitored. The failure detection unit 26 reads out the performance information on each server 1 to be monitored that is measured at a check time specified by the administrator in the check request from the monitoring terminal 3 from the performance information accumulation unit 22, determines whether the actually measured data of each performance metric is normal or abnormal based on the result of a comparison with respective model data, and detects the abnormal performance metric as the abnormal item. The spread determination unit 27 extracts and excludes the abnormal item that is common to all the servers 1 to be monitored in the same tier from the abnormal item of each server 1 to be monitored that is detected by the failure detection unit 26, and generates the abnormality information for management which shows the remaining abnormal item of each server 1 to be monitored for presentation to the administrator.

In the server operation management apparatus 2 of the exemplary embodiment that has such configuration, the spread determination unit 27 excludes the abnormal item that is common to all the servers in the same tier by considering that the abnormal item is generated by the spread from the server in another tier and uses the remaining abnormal item of each server as the abnormality information for management. Therefore, information in which the failure occurrence source is not buried can be presented to the administrator because the spread of abnormality between the tiers is excluded.

Here, when the spread of abnormality occurs, a failure occurred in one server makes a large number of servers in another tier that are connected to the server abnormal. FIG. 3 is a drawing showing an example of a spread state of a failure which occurs in the multi-tier system in the exemplary embodiment. For example, as shown in FIG. 3, when a failure occurs in one server of the application server group, it uniformly affects all the servers of the Web server group and the similar abnormality simultaneously occurs in all Web servers. As a result, when the failure of one application server spreads, the number of Web servers in which abnormality is detected is several times the number of the application servers.

The server operation management apparatus 2 of the exemplary embodiment may include an abnormality score calculation unit 28. The abnormality score calculation unit 28 counts the number of abnormal items of each server 1 to be monitored based on the abnormality information for management that is generated by the spread determination unit 27 and calculates a proportion of the number of the abnormal items in the number of the performance metrics for each server 1 to be monitored as the abnormality score.

By performing such process, the abnormality score in which a difference of the number of the performance metrics is cancelled is calculated as a value indicating the degree of the abnormality of each server 1 to be monitored. Therefore, the server 1 to be monitored on which the abnormalities are concentrated can be determined independently of the difference of the number of performance metrics of each server 1 to be monitored and a correct ranking of cause candidates can be obtained.

Moreover, the server operation management apparatus 2 of the exemplary embodiment includes a correlation model generation unit 23 and a correlation model storage unit 24. The correlation model generation unit 23 generates a transform function that indicates a correlation between the actually measured data of two performance metrics as a correlation model for each combination of the two performance metrics for each server 1 to be monitored based on normal performance information on each of the servers 1 to be monitored for a predetermined period that is accumulated in the performance information accumulation unit 22. The correlation model storage unit 24 stores each generated correlation model. The failure detection unit 26 compares the actually measured data of one among the combinations of the performance metrics in the performance information on each server to be monitored that is measured at the check time with model data calculated from the actually measured data of the other based on the correlation model for the combination. The failure detection unit 26 determines whether or not the difference satisfies a condition of a predetermined error range and detects the combination of the performance metrics for which the difference does not satisfy the condition as the above-mentioned abnormal item.

By using the above-mentioned method, a plurality of performance metric combinations for which a correlation in normal state has become corrupted can be detected and a failure occurrence source can be quickly identified based on the overlapped performance metrics among the detected combinations.

Moreover, the server operation management apparatus 2 of the exemplary embodiment includes a logical structure information storage unit 25 and a communication control unit 29. The logical structure information storage unit 25 stores multi-tier logical structure information showing the tier to which each of the plurality of servers 1 to be monitored belongs in advance. The communication control unit 29 controls communication with the monitoring terminal 3.

The performance information collection unit 21 in the server operation management apparatus 2 collects the performance information of each server 1 to be monitored therefrom that is measured therein and sends it to the performance information accumulation unit 22 sequentially.

The performance information accumulation unit 22 stores and manages the performance information on each server 1 to be monitored as time-series data for each performance metric and also outputs the performance information on each server 1 to be monitored for the specified period in response to a request from the correlation model generation unit 23 or the failure detection unit 26.

The correlation model generation unit 23 obtains the normal performance information on each server 1 to be monitored for the predetermined period from the performance information accumulation unit 22. Here, the correlation model generation unit 23 obtains the actually measured data with respect to all the performance metrics of each server 1 to be monitored. The correlation model generation unit 23 calculates the correlation model indicating the correlation with respect to all the combinations of two metrics for each server 1 to be monitored based on a predetermined arithmetic algorithm. Here, as the predetermined period, for example, one week, one month, or the like may be used. The correlation model generation unit 23 may generate the correlation model by using a technology described in Japanese Patent Application Laid-Open No. 2009-199533.

For example, when x is the actually measured data of the performance metric of one among the combinations of the performance metrics and y is the actually measured data of the performance metrics of the other in the performance information on the server 1 to be monitored, the correlation model generation unit 23 calculates a value of coefficients A and B so that the transform function "y=Ax+B" is satisfied as an arithmetic algorithm. The correlation model generation unit 23 may use the transform function "y=Ax+B" including the calculated value of the coefficients A and B as the correlation model corresponding to the combination of the performance metrics.

The correlation model storage unit 24 receives and stores the correlation model generated by the correlation model generation unit 23 and also outputs the correlation model in response to a request from the failure detection unit 26. The logical structure information storage unit 25 stores the multi-tier logical structure information in advance in which an identifier of each server 1 to be monitored is associated with a name of the tier to which the server 1 to be monitored belongs.

The failure detection unit 26 reads out the performance information of each server 1 to be monitored for the check period specified by the check request from the monitoring terminal 3 from the performance information accumulation unit 22 and also reads out the correlation model of each server 1 to be monitored from the correlation model storage unit 24. The failure detection unit 26 calculates a residual value between the actually measured data of one of the combination of the performance metrics in the performance information on each server 1 to be monitored and the model data calculated by substituting the actually measured data of the other into the correlation model according to this combination for each collection time in the check period. When the residual value exceeds a predetermined value, the failure detection unit 26 detects this combination of the performance metrics as the abnormal item.

For example, when the combination of the performance metrics is a combination of "CPU usage rate of system process" and "memory usage", the failure detection unit 26 compares model data of "memory usage" calculated based on the correlation model by using the "CPU usage rate of system process" as an input with the actually measured data of "memory usage". When the residual is not within the predetermined allowable range, the failure detection unit 26 detects this combination as the abnormal item.

The spread determination unit 27 identifies the tier (server group) to which each server 1 to be monitored belongs based on the logical structure information stored in the logical structure information storage unit 25 in advance and extracts the abnormal item that is common to all the servers 1 to be monitored in the same tier from the abnormal item of each server 1 to be monitored that is detected by the failure detection unit 26. The spread determination unit 27 generates the abnormality information for management in which the spread of abnormality is taken into account by excluding this extracted common abnormal item from all the abnormal items of each server to be monitored.

Here, the function of the spread determination unit 27 will be described based on a specific example shown in FIG. 4 and FIG. 5. FIG. 4 is a drawing showing an example of the abnormal item in the exemplary embodiment. FIG. 4 shows the abnormal item of each server 1 to be monitored that is detected by the failure detection unit 26 when three Web servers and two application servers are the servers 1 to be monitored. FIG. 5 is a drawing showing an example of abnormality information for management in the exemplary embodiment. FIG. 5 shows the abnormality information for management generated by extracting and excluding the abnormal item that is common among the servers 1 to be monitored in each tier from the abnormal item of each server 1 to be monitored shown in FIG. 4 by the spread determination unit 27.

In FIG. 4 and FIG. 5, "Web1", "Web2", or "Web3" represents an identifier (server name) of the Web server and "AP1" or "AP2" represents the identifier (server name) of the application servers. In FIG. 4, as the abnormal item of each server, the combination of the performance metrics (one is a performance metric u and the other is a performance metric y) in which the abnormality in correlation is detected is shown. Where, "CPU user %" represents the CPU usage rate of a user process. "CPU system %" represents the CPU usage rate of a system process. "Disk IO/sec" represents a disk input/output rate. "Mem used %" represents a memory usage. "Disk used %" represents a disk usage. "CPU Wait I/O %" represents a CPU input/output waiting time. "Packet Recv" and "Packet Sent" represent the number of the reception packets and the number of the transmission packets, respectively.

In an example shown in FIG. 4, in the Web server group composed of "Web 1", "Web2", and "Web3", the combination of "CPU user %" and "CPU system %" and the combination of "Mem used %" and "Disk used %" are the abnormal items that are common among three Web servers. On the other hand, in the application server group composed of "AP1" and "AP2", there is no common abnormal item between two application servers. As a result, the abnormality information for management shown in FIG. 5 is generated by the spread determination unit 27.

The abnormality score calculation unit 28 receives the abnormality information for management from the spread determination unit 27 and counts the number of abnormal items of each server 1 to be monitored based on the abnormality information for management. The abnormality score calculation unit 28 calculates the proportion of the number of the abnormal items in the total number of the combinations of two metrics as the abnormality score for each server 1 to be monitored and sends the information indicating the abnormality score of each server 1 to be monitored and the above-mentioned abnormality information for management to the monitoring terminal 3. FIG. 6 is a drawing showing an example of information outputted from the abnormality score calculation unit 28 in the exemplary embodiment. As shown in FIG. 6, the information outputted by the abnormality score calculation unit 28 is a table having four columns of the server identifier, the number of the abnormal items; the total number of the combinations of the metrics (the number of the correlation models), and the abnormality score. In an example shown in FIG. 6, the server identifier "AP1" that represents one of the application servers, the abnormal items "7", the number of the correlation models "20", and the abnormality score "0.35" are recorded in the first record of the table.

The monitoring terminal 3 sends the check command to the server operation management apparatus 2 according to the operation by the administrator. The monitoring terminal 3 displays the monitoring information based on the abnormality score of each server 1 to be monitored and the abnormality information for management that are sent from the server operation management apparatus 2 on the management screen 31 in response to the check command.

Figure 7:
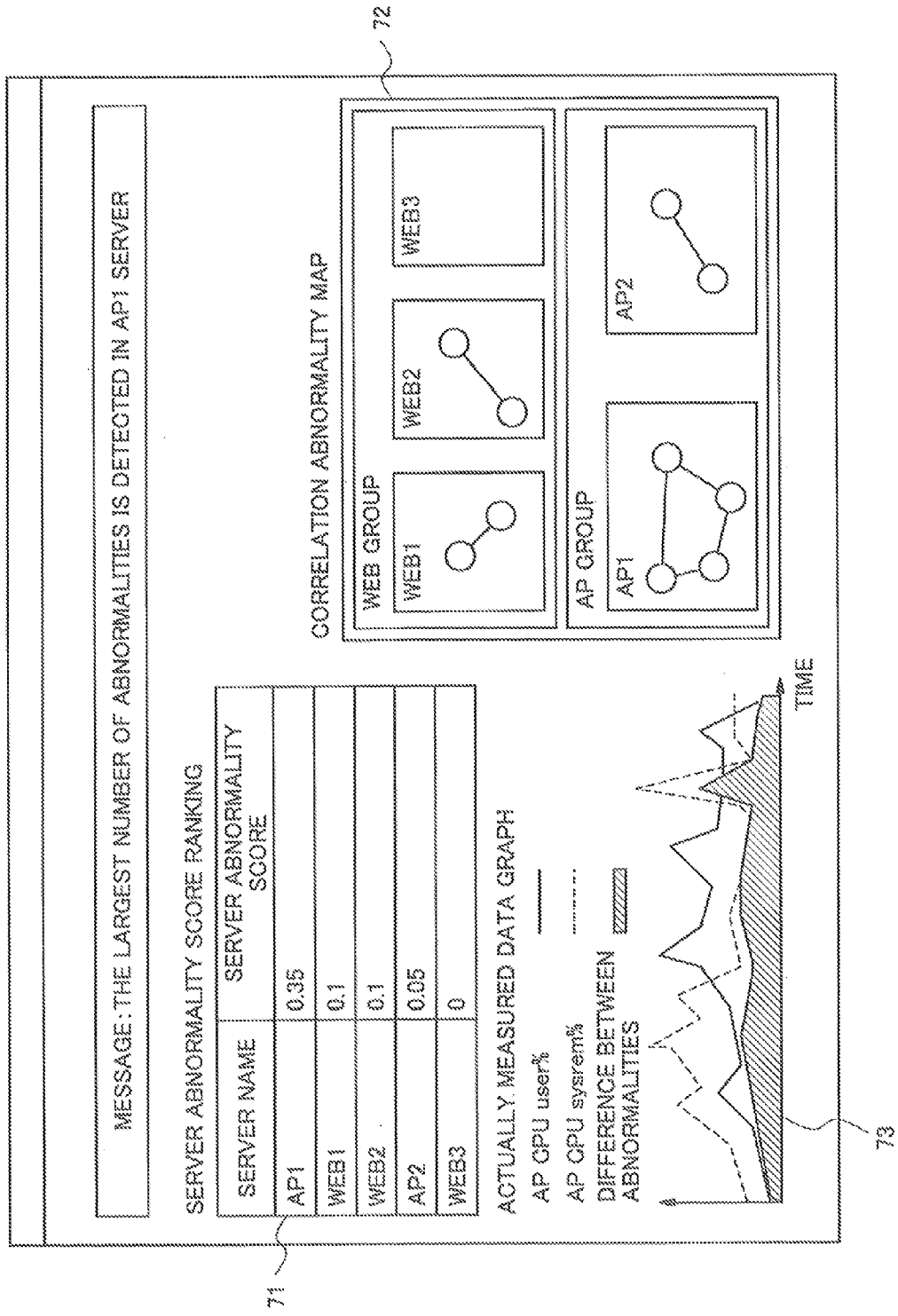
FIG. 7 A drawing showing an example of monitoring information displayed in a management screen 31 of a monitoring terminal 3 in the exemplary embodiment.

FIG. 7 is a drawing showing an example of the monitoring information displayed on the management screen 31 of the monitoring terminal 3 in the exemplary embodiment. The monitoring information shown in FIG. 7 includes a table 71 showing the abnormality score of each server 1 to be monitored, a correlation abnormality map 72, and an actually measured data graph 73. The table 71 has the column of the server identifier and the abnormality score. The row of the table 71 may be arranged according to the abnormality score. The number of rows of the table 71 may be limited to the number determined by the administrator. As a result, the administrator can easily grasp the server 1 to be monitored that is most likely to be abnormal from the result of the analysis.

The relation between each tier and each server 1 to be monitored is shown in a quadrangular area of the correlation abnormality map 72. A circle representing the metric is displayed in an area of each server 1 to be monitored and a straight line is drawn between the metrics in which the abnormality is detected. The actually measured data graph 73 includes a graph showing the actually measured data of the both metrics in which the abnormality is detected in chronological order and a graph showing the difference between the actually measured data and the correlation model that is calculated by the failure detection unit 26.

The server operation management apparatus 2 of the exemplary embodiment includes the logical structure information storage unit 25 and the spread determination unit 27 identifies the tier (server group) to which each server 1 to be monitored belongs based on the logical structure information stored in the logical structure information storage unit 25 in advance. However, the configuration of the server operation management apparatus 2 is not limited to this. A configuration in which the server operation management apparatus 2 does not include the logical structure information storage unit 25 and the spread determination unit 27 discriminates the tier to which each server 1 to be monitored belongs by using a server identifier included in the above-mentioned performance information on each server 1 to be monitored may be used. For example, when the server identifier included in the performance information is "Web2", the spread determination unit 27 may discriminate that a tier to which the Web server whose identifier is "Web2" belongs is the same as the tier to which the Web servers whose identifiers are "Web5" and "Web3" belong because a "Web" part is included in the these identifiers.

In the server operation management apparatus 2 of the exemplary embodiment, the spread determination unit 27 excludes the abnormal item that is common to the servers 1 to be monitored in the same tier by considering that the abnormal item is generated by the spread of abnormality from the server in another tier and the remaining abnormal item is displayed as the abnormality information for management. Therefore, a problem in which the failure occurrence source becomes buried by the spread of abnormality between the tiers can be solved. Additionally, the abnormality score that is an indicator independent of the difference of the number of metrics between the servers is calculated for each server 1 to be monitored. Therefore, the administrator can easily identify the server 1 to be monitored that is more likely to be the failure occurrence source.

Next, operation of the server operation management apparatus 2 in the exemplary embodiment will be described. Here, a description about the operation described below also includes a description about the exemplary embodiment of a server operation management method of the present invention.

Figure 8:
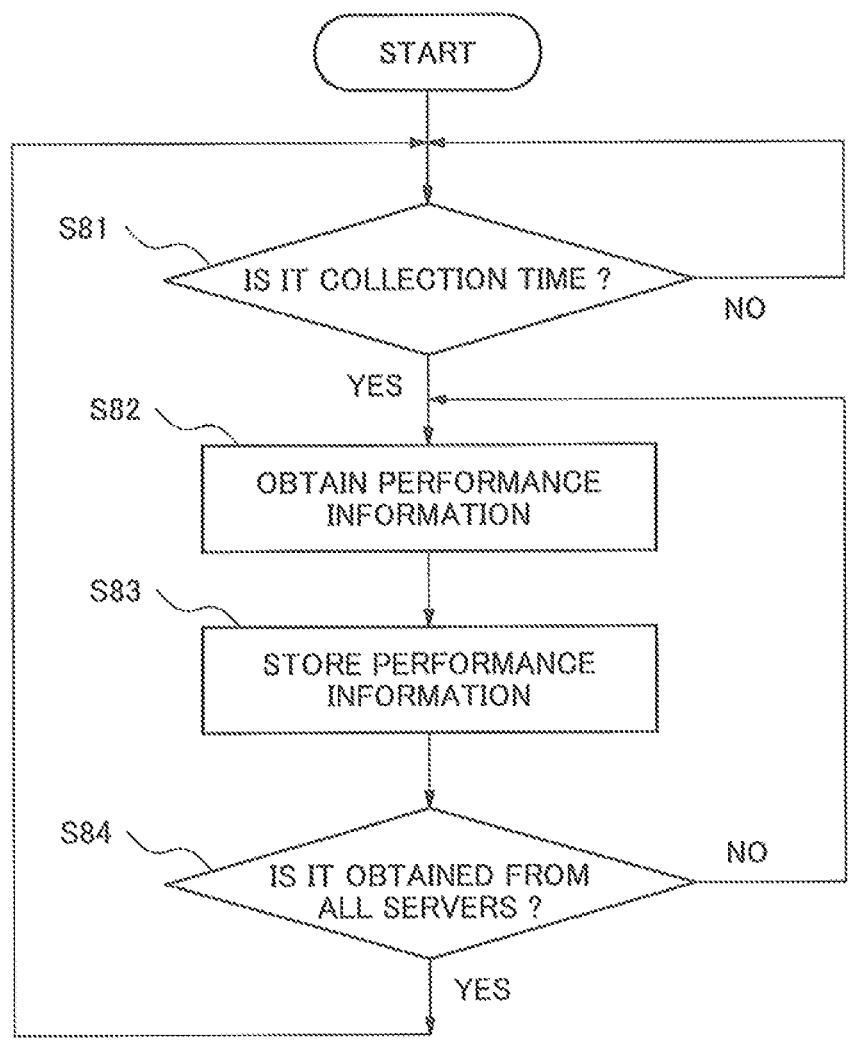
FIG. 8 A flowchart showing an example of a performance information collection operation of a server operation management apparatus of the exemplary embodiment.

FIG. 8 is a flowchart showing a performance information collection operation of the server operation management apparatus 2 of the exemplary embodiment. As shown in FIG. 8, first, the performance information collection unit 21 determines whether or not it is a collection time which is set according to a predetermined time interval (for example, one minute interval) in advance (step S81 in FIG. 8) and when it determines that it is the collection time, it accesses the server 1 to be monitored and obtains the performance information (step S82 in FIG. 8). The performance information accumulation unit 22 stores the obtained performance information on the server 1 to be monitored (step S83 in FIG. 8). Next, the performance information collection unit 21 determines whether or not the performance information has been obtained from all the servers 1 to be monitored by referring to the logical structure information stored in the logical structure information storage unit 25 (step S84 in FIG. 8) and when the performance information has been obtained from all the servers 1 to be monitored, it waits until the next collection time.

Figure 9:
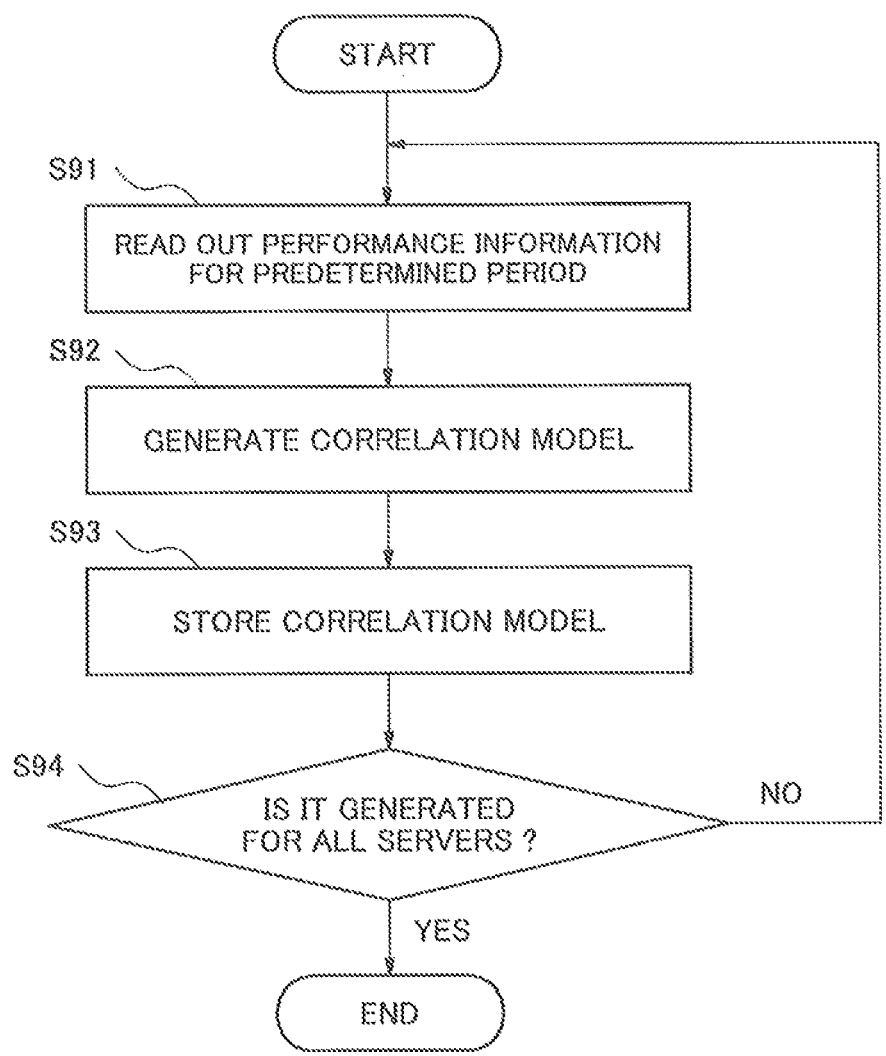
FIG. 9 A flowchart showing an example of a correlation model generation operation of the server operation management apparatus of the exemplary embodiment.

Next, FIG. 9 is a flowchart showing a correlation model generation operation of the server operation management apparatus 2 of the exemplary embodiment.

First, the correlation model generation unit 23 reads out the normal performance information on each servers 1 to be monitored for the predetermined period (for example, one week) that is accumulated in the performance information accumulation unit 22 according to an instruction from the monitoring terminal 3 (step S91 in FIG. 9). The correlation model generation unit 23 generates the transform function that indicates the correlation between the actually measured data of the performance metric as the correlation model for each combination of two performance metrics for each server 1 to be monitored (step S92 in FIG. 9). The correlation model storage unit 24 stores each of the generated correlation models (step S93 in FIG. 9). When the correlation model generation unit 23 generates the correlation model for all the servers 1 to be monitored (YES of step S94 in FIG. 9), it finishes the correlation model generation operation.

Figure 10:
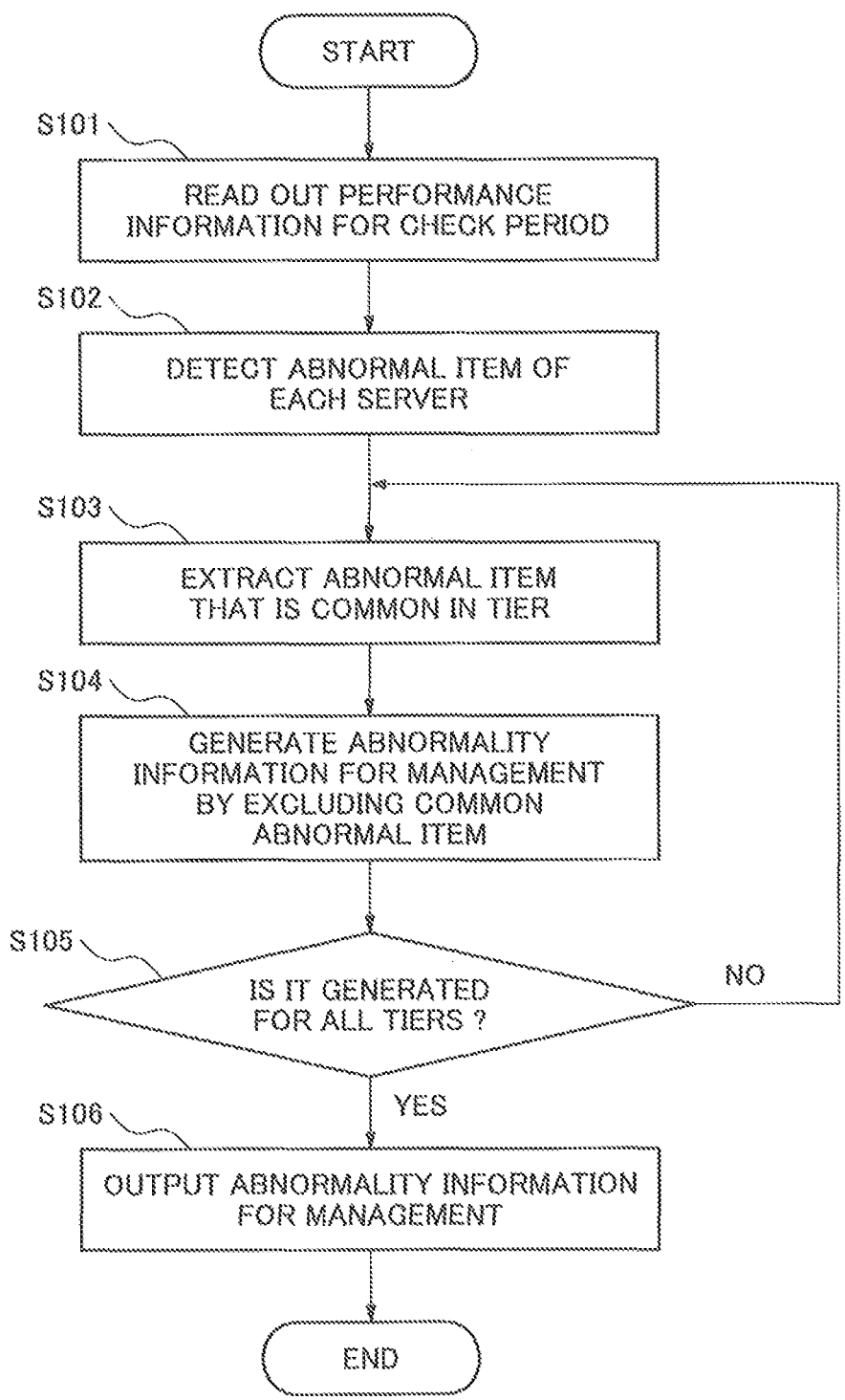
FIG. 10 A flowchart showing an example of a generating operation of the abnormality information for management of the server operation management apparatus of the exemplary embodiment.

Next, FIG. 10 is a flowchart showing a detection operation of the abnormality information for management of the server operation management apparatus 2 of the exemplary embodiment.

First, the failure detection unit 26 reads out the performance information on each server 1 to be monitored for each measurement time included in a check object period (for example, one week) specified by the monitoring terminal 3 from the performance information accumulation unit 22 (step S101 in FIG. 10). The failure detection unit 26 determines whether or not each combination of the actually measured data of performance metrics satisfies a corresponding correlation model (transform function) within a predetermined error range and detects the combination of the performance metrics which does not satisfy the corresponding correlation model as the abnormal item (step S102 in FIG. 10).

Next, the spread determination unit 27 extracts the abnormal item that is common to all the servers 1 to be monitored in the same tier from the abnormal item of each server 1 to be monitored that is detected by the failure detection unit 26 by referring to the logical structure information (step S103 in FIG. 10). The spread determination unit 27 generates the abnormality information for management which indicates the remaining abnormal item obtained by excluding this extracted common abnormal item from the abnormal item of each server 1 to be monitored (step S104 in FIG. 10). When the abnormality information for management is generated for all the tiers (YES of step S105 in FIG. 10), the spread determination unit 27 outputs the abnormality information for management to the abnormality score calculation unit 28 (step S106 in FIG. 10).

By performing these steps, the abnormal item that is common to all the servers 2 to be monitored in the same tier is excluded by considering that the abnormal item is generated by the spread of abnormality from the server in another tier and the remaining abnormal item is used as the abnormality information for management. Therefore, a problem in which the abnormality occurrence source becomes buried by the spread of abnormality between the tiers can be suppressed.

Figure 11:
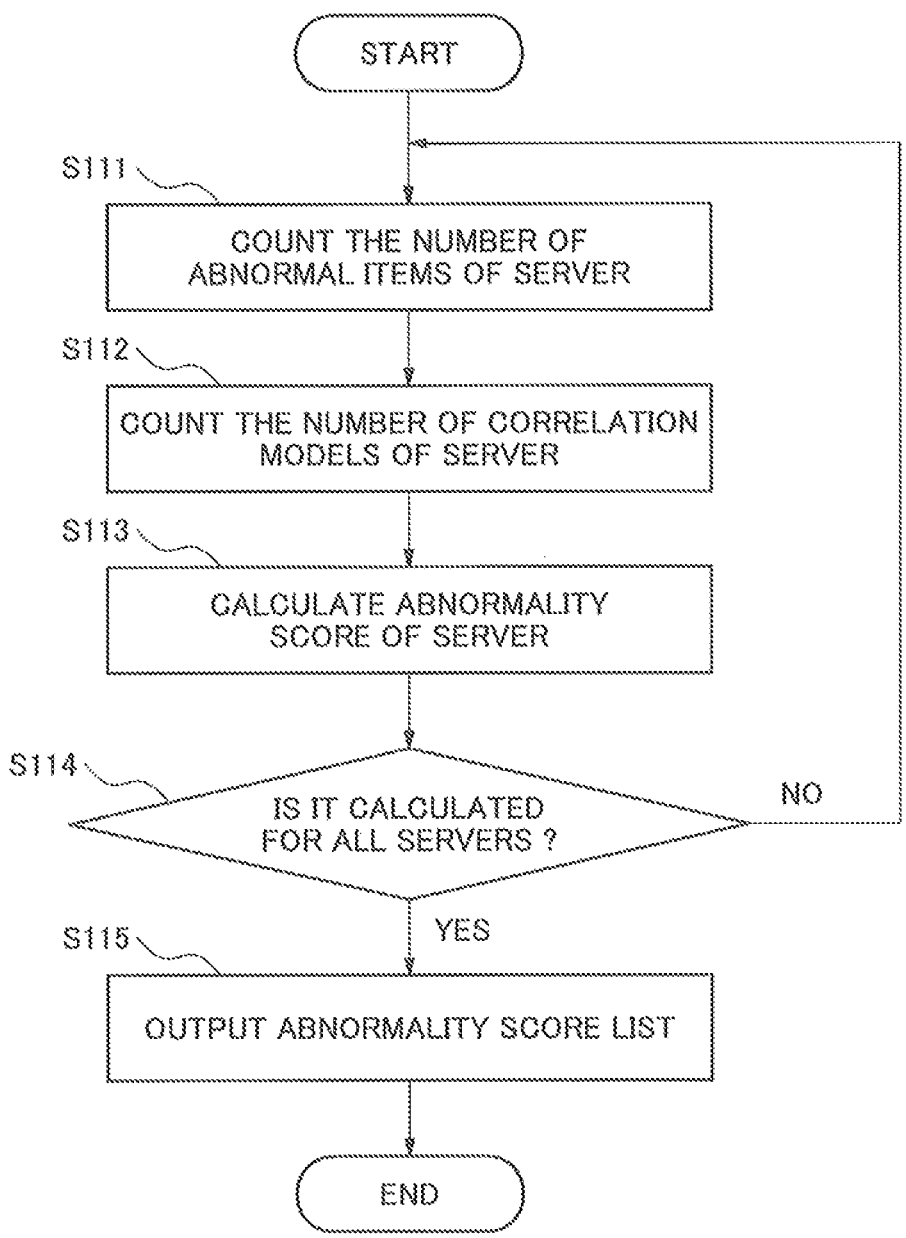
FIG. 11 A flowchart showing an example of an abnormality score calculation operation of the server operation management apparatus of the exemplary embodiment.

Next, FIG. 11 is a flowchart showing an abnormality score calculation operation of the server operation management apparatus 2 of the exemplary embodiment.

First, the abnormality score calculation unit 28 counts the number of abnormal items for each server 1 to be monitored based on the abnormality information for management inputted from the spread determination unit 27 (step S111 in FIG. 11). The abnormality score calculation unit 28 counts the number of correlation models for each server 1 to be monitored by referring to the correlation model stored in the correlation model storage unit 24 (step S112 in FIG. 11). Next, the abnormality score calculation unit 28 calculates a proportion of the number of the abnormal items in the number of the correlation models for each server 1 to be monitored as the abnormality score (step S113 in FIG. 11).

When the abnormality score is calculated for all the servers 1 to be monitored (YES of step S114 in FIG. 11), the abnormality score of each server 1 to be monitored is outputted to the monitoring terminal 3 (step S115 in FIG. 11).

By performing these steps, the abnormality score according to the number of the metrics can be calculated for each server 1 to be monitored, and thus the server 1 to be monitored on which the abnormalities are concentrated can be determined independently of the number of the metrics and a correct ranking of cause candidates can be obtained.

A configuration in which function contents of the performance information collection unit 21, the correlation model generation unit 23, the failure detection unit 26, the spread determination unit 27, and the abnormality score calculation unit 28 in the above-mentioned server operation management apparatus 2 are realized by executing a computer program may be used.

Figure 12:
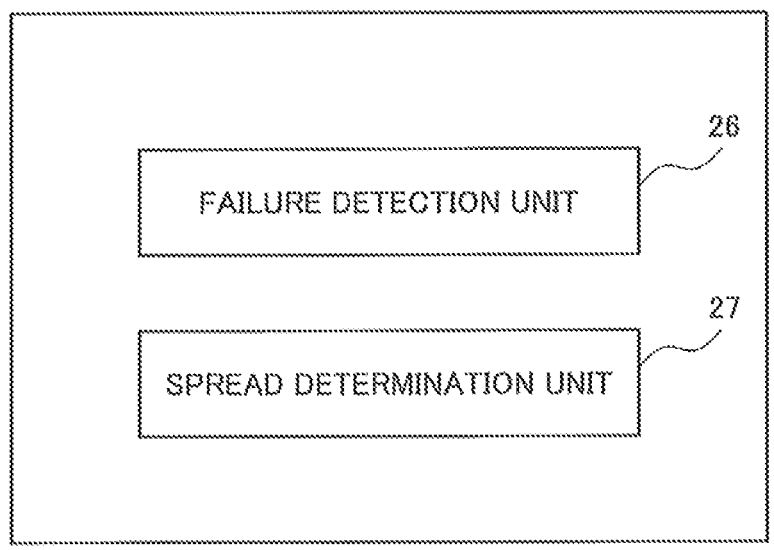
FIG. 12 A block diagram showing a characteristic configuration of the exemplary embodiment.

Next, a characteristic configuration of the exemplary embodiment will be described. FIG. 12 is a block diagram showing the characteristic configuration of the exemplary embodiment.

The operation management apparatus includes the failure detection unit 26 and the spread determination unit 27.

Here, the failure detection unit 26 obtains the measured values of a plurality of performance metrics with respect to each of the plurality of target apparatuses to be monitored that are connected to the common apparatus and detects the abnormal item which is the performance metric whose measured value is abnormal with respect to each of the plurality of target apparatuses to be monitored. The spread determination unit 27 outputs the remaining abnormal item excluding the abnormal item detected in all the plurality of target apparatuses to be monitored from the abnormal item of each of the plurality of target apparatuses to be monitored.

As mentioned above, the server operation management apparatus 2 of the exemplary embodiment determines similarity among the abnormalities that occur in each server group by using a feature of a load distributing cluster server group, identifies the spread of abnormality that occurs between the server groups, and corrects the abnormality information. Therefore, the administrator can easily discriminate the cause of the abnormality.

When the server operation management apparatus 2 of the exemplary embodiment detects the abnormality of a plurality of servers 1 to be monitored in the multi-tier system, it excludes the abnormal item that is common to all the servers 1 to be monitored in the same tier from the abnormal item of each server 1 to be monitored by considering that the abnormal item is generated by the spread of abnormality from the server in another tier and uses the remaining abnormal item as the abnormality information for management. Therefore, by relatively increasing the number of abnormal items of the server 1 to be monitored that is the failure occurrence source, a problem in which the failure occurrence source becomes buried can be suppressed. Consequently, the administrator can easily grasp the server 1 to be monitored that is most likely to be abnormal from the result of the analysis and can correctly and quickly elucidate the cause of the abnormality that occurs in the multi-tier system.

In the above-mentioned related technology disclosed in Japanese Patent Application Laid-Open No. 2009-199533 or the like, in the multi-tier system, when the number of metrics of the server that is the failure occurrence source is small, a problem in which the cause of the failure becomes buried occurs.

For example, the number of metrics of one of the application server and the database server is many times the number of metrics of the other because of a difference of the number of the installed disks and a difference of the number of monitoring items of software between these servers, so that there is a relatively large difference of the number of the metrics between the server groups of respective tiers. Here, when a server in which the total number of metrics is relatively small is a failure occurrence source, because an upper limit of the number of the abnormal metrics of the server that is the failure occurrence source is small compared with another one, the number of the abnormal metrics of the server is smaller than the number of abnormal metrics of another server to which the failure has spread even when all the metrics indicate abnormal. Usually, the administrator starts a check from a server in which an absolute value of the number of the abnormal metrics is large. Therefore, the abnormality of the server that is the failure occurrence source becomes buried in the abnormality of the other server group. For this reason, the administrator focuses on the wrong server. As a result, the administrator wrongly determines the cause of the abnormality.

The server operation management apparatus 2 of the exemplary embodiment calculates the abnormality score corresponding to the number of metrics for each server 1 to be monitored. Therefore, it is enable to perform a seamless analysis including the server 1 to be monitored in which the number of the metrics is relatively small, identify the server 1 to be monitored on which the abnormalities are concentrated independently of the difference of the number of the metrics between the servers 1 to be monitored, and obtain a correct ranking of the cause candidates. As a result, the administrator can correctly and quickly identify a fault location.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

For example, in the above-mentioned exemplary embodiment, when the measured values of two performance metrics does not satisfy the correlation model corresponding to the two performance metrics, the failure detection unit 26 detects the combination of the two performance metrics as the abnormal item. However, the failure detection unit 26 may determine whether or not each performance metric is abnormal by performing a comparison between the measured value of each performance metric and a predetermined threshold value or the like and may output each performance metric for which it is determined that it is abnormal as the abnormal item.

This application is the National Phase of PCT/JP2010/073058, filed Dec. 15, 2010, which is based upon and claims the benefit of priority from Japanese patent application No. 2010-003008, filed on Jan. 8, 2010, the disclosure of which is incorporated herein in its entirety by reference.

Industrial Applicability

The present invention can be applied to a technology for monitoring an operating status of each server in the multi-tier system.

REFERENCE SIGNS LIST 1 server to be monitored
2 server operation management apparatus
3 monitoring terminal
21 performance information collection unit
22 performance information accumulation unit
23 correlation model generation unit
24 correlation model storage unit
25 logical structure information storage unit
26 failure detection unit
27 spread determination unit
28 abnormality score calculation unit
29 communication control unit
31 management screen

What is claimed is:

1. An operation management apparatus comprising:
a failure detection unit which obtains measured values of a plurality of performance metrics with respect to each of a plurality of target apparatuses to be monitored that are connected to a common apparatus and detects an abnormal item which is a performance metric whose measured value is abnormal with respect to each of said plurality of target apparatuses to be monitored;
a spread determination unit which outputs remaining abnormal item excluding said abnormal item detected in all said plurality of target apparatuses to be monitored from said abnormal item of each of said plurality of target apparatuses to be monitored; and
a memory which stores said obtained measured values of said plurality of performance metrics.

2. The operation management apparatus according to claim 1 further comprising a correlation model storage unit which stores a transform function for each two different performance metrics among said plurality of performance metrics with respect to each of said plurality of target apparatuses to be monitored, said transform function indicating a correlation between said two performance metrics,
wherein said failure detection unit detects said two performance metrics as said abnormal item when a difference between a value obtained by inputting a measured value of one of said two performance metrics among said plurality of performance metrics in said transform function corresponding to said two performance metrics and a measured value of the other is equal to or greater than a predetermined value.

3. The operation management apparatus according to claim 2 further comprising an abnormality score calculation unit which outputs a proportion of the number of said abnormal items outputted by said spread determination unit in the number of said transform functions of said target apparatus to be monitored as an abnormality score with respect to each of said plurality of target apparatuses to be monitored.

4. The operation management apparatus according to claim 3,
wherein said memory stores said measured values of said plurality of performance metrics in time series that are measured in each of said plurality of target apparatuses to be monitored; and
further comprising a correlation model generation unit which generates said transform function based on said measured values of said plurality of performance metrics for a predetermined period that are stored in said memory and saves said generated transform function in said correlation model storage unit.

5. An operation management method comprising:
obtaining measured values of a plurality of performance metrics with respect to each of a plurality of target apparatuses to be monitored that are connected to a common apparatus;
detecting an abnormal item which is a performance metric whose measured value is abnormal with respect to each of said plurality of target apparatuses to be monitored; and
outputting remaining abnormal item excluding said abnormal item detected in all said plurality of target apparatuses to be monitored from said abnormal item of each of said plurality of target apparatuses to be monitored.

6. The operation management method according to claim 5 further comprising storing a transform function for each two different performance metrics among said plurality of performance metrics with respect to each of said plurality of target apparatuses to be monitored, said transform function indicating a correlation between said two performance metrics,
wherein said detecting an abnormal item detects said two performance metrics as said abnormal item when a difference between a value obtained by inputting a measured value of one of said two performance metrics among said plurality of performance metrics in said transform function corresponding to said two performance metrics and a measured value of the other is equal to or greater than a predetermined value.

7. The operation management method according to claim 6 further comprising outputting a proportion of the number of said abnormal items in the number of said transform functions of said target apparatus to be monitored as an abnormality score with respect to each of said plurality of target apparatuses to be monitored.

8. The operation management method according to claim 7 further comprising:
storing said measured values of said plurality of performance metrics in time series that are measured in each of said plurality of target apparatuses to be monitored; and
generating said transform function based on said measured values of said plurality of performance metrics for a predetermined period.

9. A non-transitory computer readable medium recording thereon an operation management program, causing computer to perform a method comprising:
obtaining measured values of a plurality of performance metrics with respect to each of a plurality of target apparatuses to be monitored that are connected to a common apparatus;

detecting an abnormal item which is a performance metric whose measured value is abnormal with respect to each of said plurality of target apparatuses to be monitored; and outputting remaining abnormal item excluding said abnormal item detected in all said plurality of target apparatuses to be monitored from said abnormal item of each of said plurality of target apparatuses to be monitored.

10. The non-transitory computer readable medium according to claim 9, recording thereon said operation management program, further comprising storing a transform function for each two different performance metrics among said plurality of performance metrics with respect to each of said plurality of target apparatuses to be monitored, said transform function indicating a correlation between said two performance metrics, wherein said detecting an abnormal item detects said two performance metrics as said abnormal item when a difference between a value obtained by inputting a measured value of one of said two performance metrics among said plurality of performance metrics in said transform function corresponding to said two performance metrics and a measured value of the other is equal to or greater than a predetermined value.

11. The non-transitory computer readable medium according to claim 10, recording thereon said operation management program, further comprising outputting a proportion of the number of said abnormal items in the number of said transform functions of said target apparatus to be monitored as an abnormality score with respect to each of said plurality of target apparatuses to be monitored.

12. The non-transitory computer readable medium according to claim 11, recording thereon said operation management program, further comprising:

storing said measured values of said plurality of performance metrics in time series that are measured in each of said plurality of target apparatuses to be monitored; and generating said transform function based on said measured values of said plurality of performance metrics for a predetermined period.

13. An operation management apparatus comprising:

failure detection means for obtaining measured values of a plurality of performance metrics with respect to each of a plurality of target apparatuses to be monitored that are connected to a common apparatus and detecting an abnormal item which is a performance metric whose measured value is abnormal with respect to each of said plurality of target apparatuses to be monitored;

spread determination means for outputting remaining abnormal item excluding said abnormal item detected in all said plurality of target apparatuses to be monitored from said abnormal item of each of said plurality of target apparatuses to be monitored; and memory means for storing said obtained measured values of said plurality of performance metrics.

* * * * *